J. A. PRICE.
LIQUID DISPENSING APPARATUS.
APPLICATION FILED DEC. 18, 1916.
1,335,700.
Patented Mar. 30, 1920.
5 SHEETS—SHEET 3.
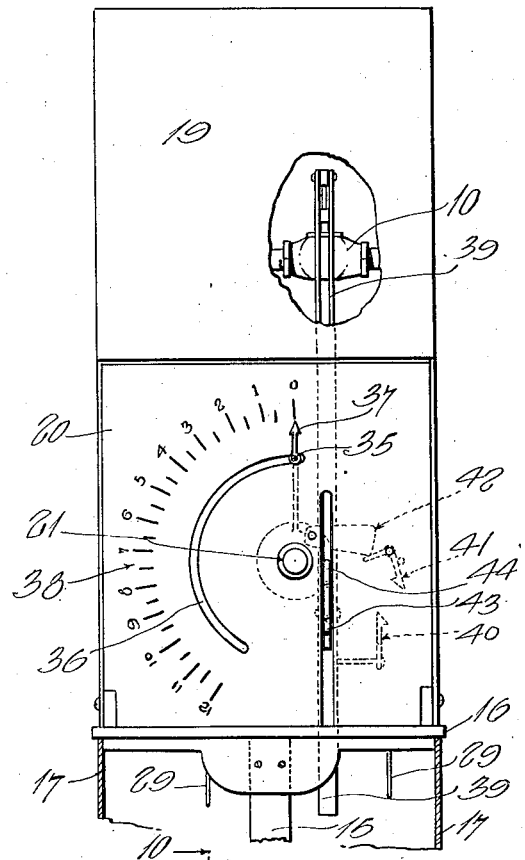
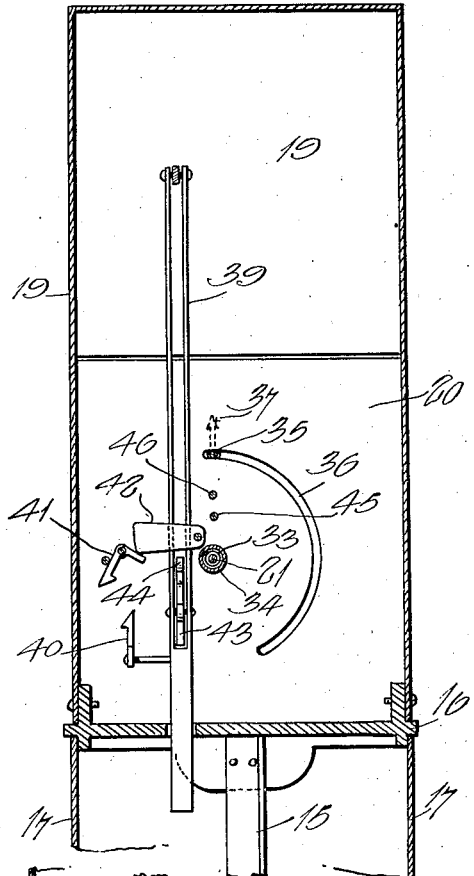
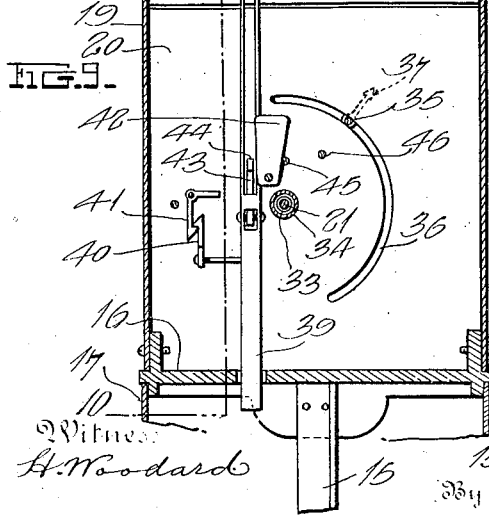
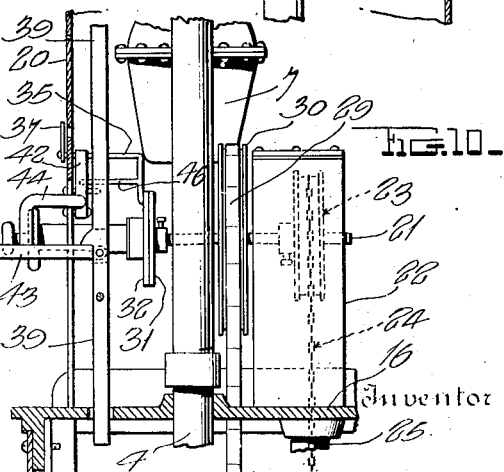
Inventor
J. A. Price
By H. B. Wilson & Co.
Attorneys
Witness
H. Woodard

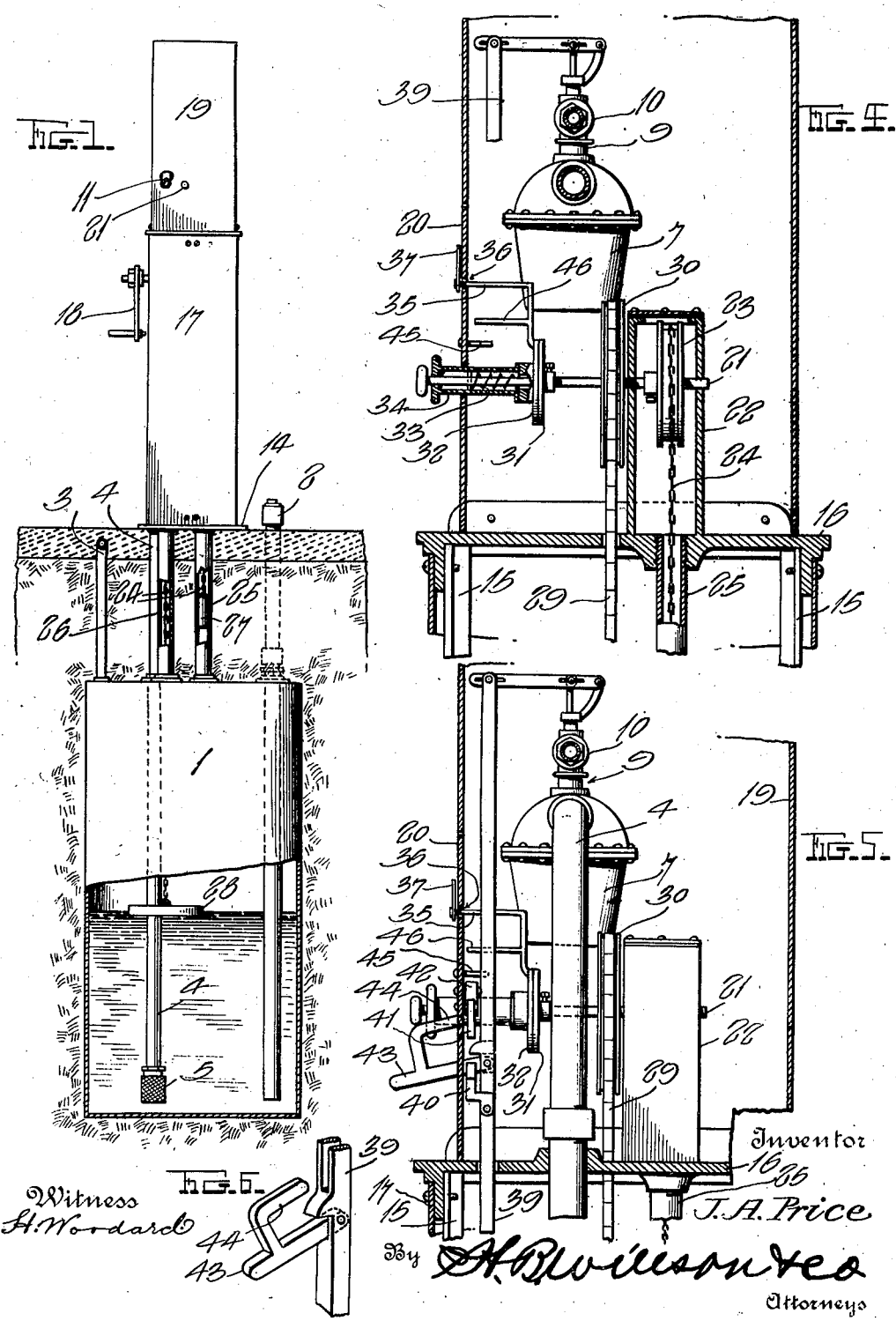

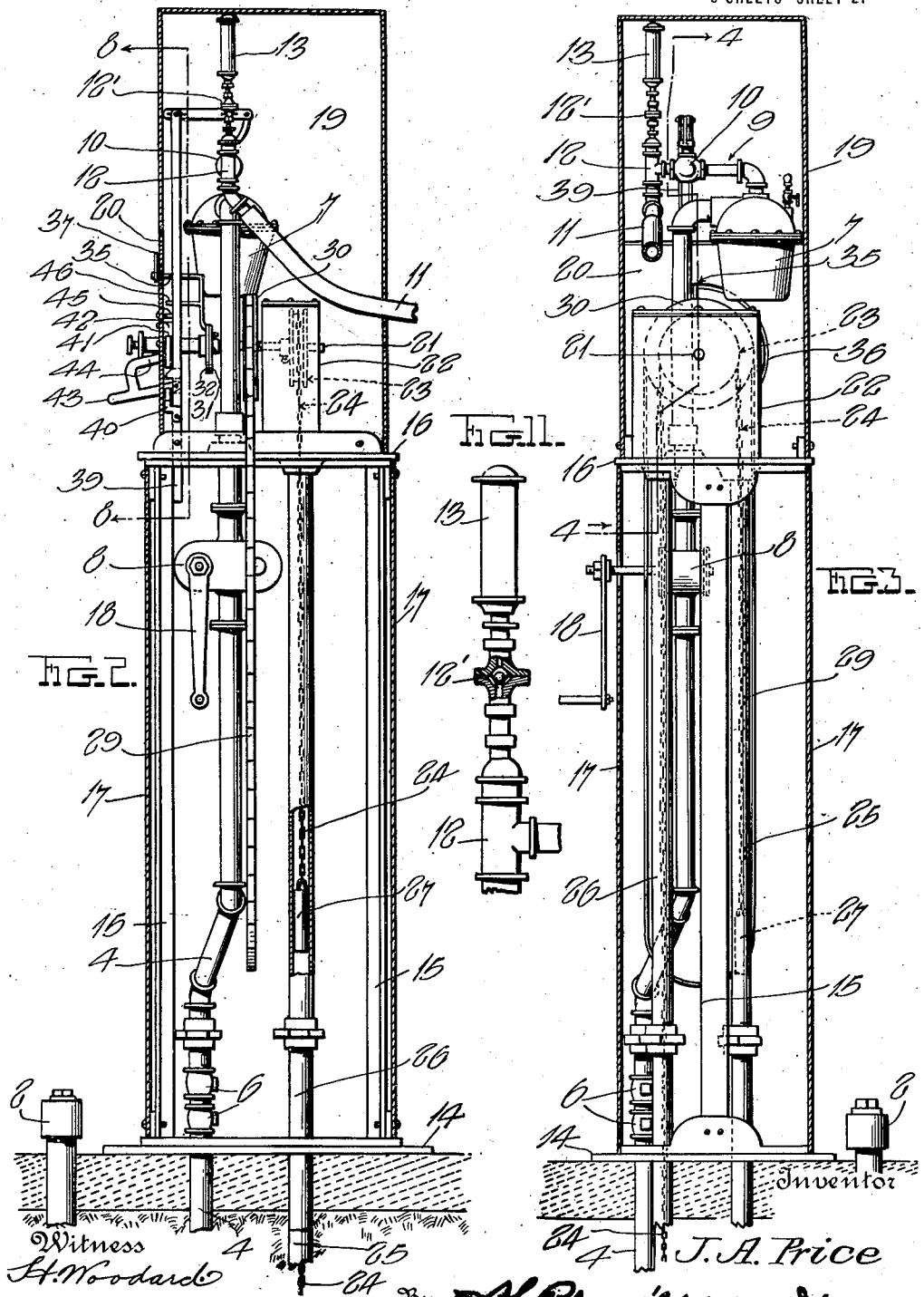

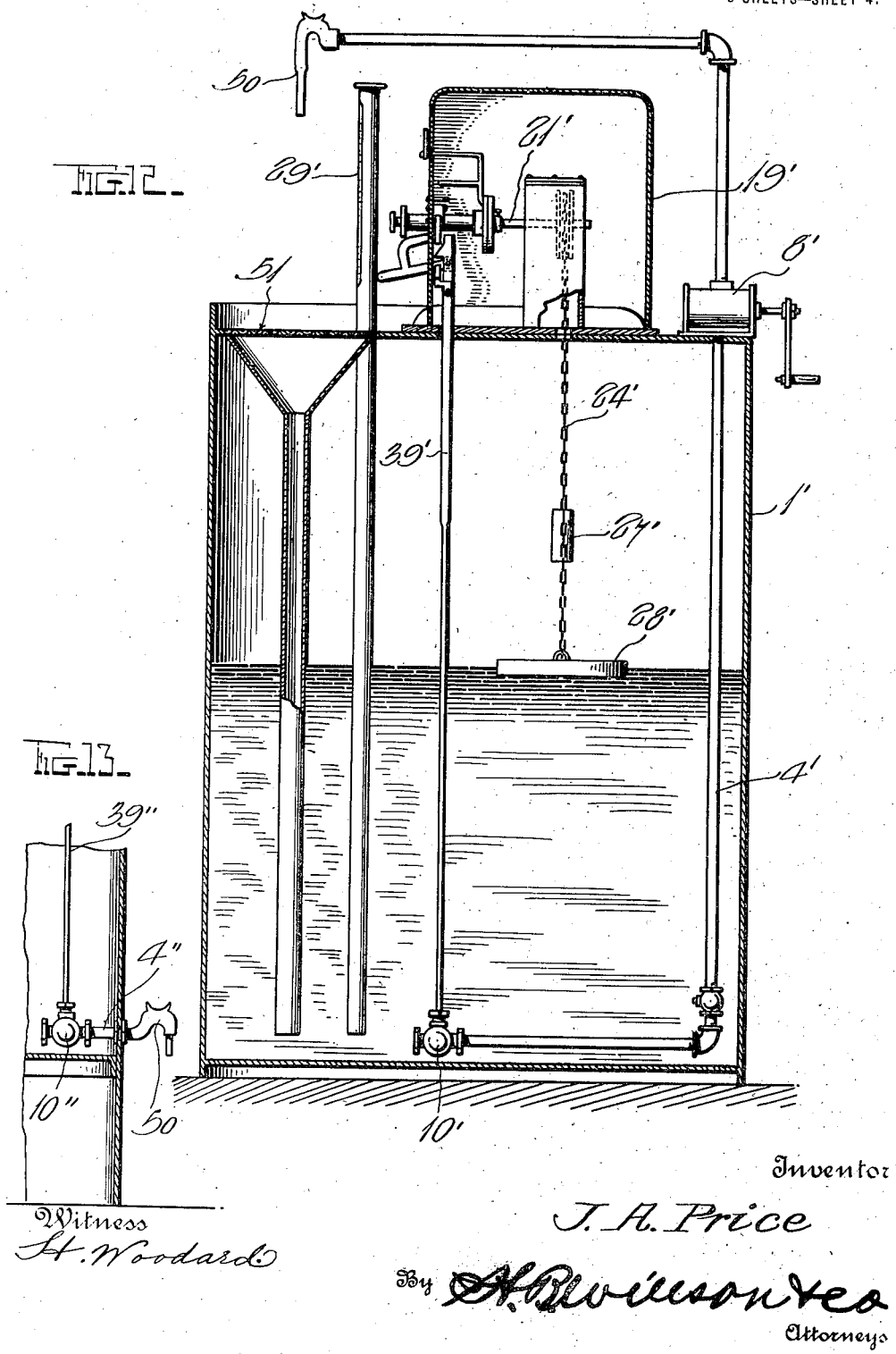

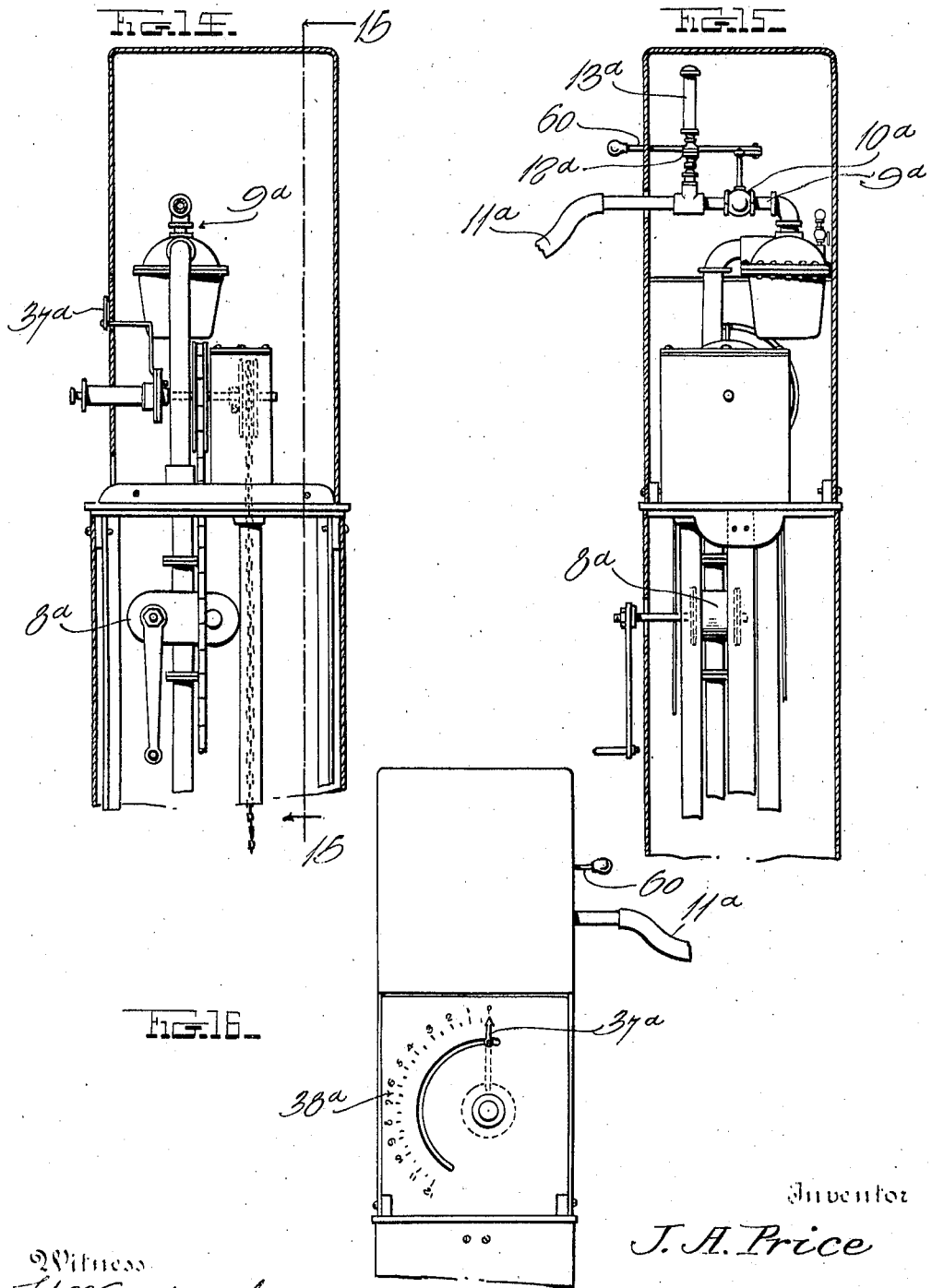

UNITED STATES PATENT OFFICE.

JAMES ALBERT PRICE, OF NEW ORLEANS, LOUISIANA, ASSIGNOR TO PRICE OIL TANK WORKS, INC., OF NEW ORLEANS, LOUISIANA.

LIQUID-DISPENSING APPARATUS.

1,335,700.　　　　Specification of Letters Patent.　　Patented Mar. 30, 1920.

Application filed December 18, 1916. Serial No. 137,663.

*To all whom it may concern:*

Be it known that I, JAMES A. PRICE, a citizen of the United States, residing at New Orleans, in the county of Orleans and State of Louisiana, have invented certain new and useful improvements in Liquid-Dispensing Apparatus; and I do declare the following to be a full, clear, and exact description of the invention, such as will enable others skilled in the art to which it appertains to make and use the same.

My invention has for its object to provide a liquid dispensing apparatus having improved means for measuring any required quantity.

A further object is to provide novel means for automatically cutting off the supply of liquid when the proper amount has been dispensed.

With these general objects in view, the invention resides in certain novel features of construction and in unique combinations of parts to be hereinafter fully described and claimed, the descriptive matter being supplemented by the accompanying drawings which constitute a part of this application and in which:

Figure 1 is an elevation, partly in section, of one form of the improved apparatus embodying an underground supply tank, parts being broken away and in section;

Fig. 2 is an enlarged side elevation, partly in section, showing the normal positions of parts;

Fig. 3 is an elevation, partly in section, taken at right angles to Fig. 2;

Fig. 4 is a vertical section on the planes of the line 4—4 of Fig. 3;

Fig. 5 is an enlarged elevation similar to the upper end of Fig. 2, parts being in section;

Fig. 6 is a perspective view of a part of the control rod of the outlet valve and the operating handle for said rod;

Fig. 7 is an edge view of the upper end of the apparatus showing more particularly the location of the indicating scale and the indicator coöperating therewith, parts being broken away and in section;

Fig. 8 is a vertical transverse section on the plane indicated by the line 8—8 of Fig. 2, showing the normal positions of parts;

Fig. 9 is a duplicate of Fig. 8 but illustrating the relation of parts when liquid is being discharged;

Fig. 10 is a vertical section on the plane of the line 10—10 of Fig. 9, this view being similar to Fig. 5, although it discloses the several parts in different positions;

Fig. 11 is a detail elevation with parts in section to more clearly show the check valve which permits draining of the discharge hose or the like by admitting air into the same after the outlet valve has been closed;

Fig. 12 is a vertical section with parts in elevation showing the improved features of construction arranged in a slightly different manner and employed in connection with a tank used in stores and the like;

Fig. 13 is a detail section to illustrate the manner in which the outlet valve of the improved apparatus may be employed in connection with a tank from which the liquid is discharged by gravity than by a pump as in the preceding forms;

Fig. 14 is a view similar to Fig. 2 disclosing another type of the invention in which the automatic cut off means for the outlet valve is eliminated;

Fig. 15 is a vertical section of Fig. 14 on the plane of the line 15—15 thereof;

Fig. 16 is an elevation of the upper end of the form of the apparatus shown in Figs. 14 and 15.

In the form of the invention depicted in Figs. 1 to 10, the numeral 1 designates a supply tank adapted to be embedded in the earth, said tank having any suitable filling pipe 2 and vent 3 for permitting the entrance and expulsion of air as the tank is respectively emptied or filled. An outlet pipe line 4 rises from the tank 1 and preferably is equipped with a strainer 5 on its lower end and with upwardly opening check valves 6 at suitable points. The upper end of the pipe line 4 delivers into a suitable filter 7 and between its ends said line is equipped with any appropriate pump 8. Suitable pipe connections 9 having therein a cutoff valve 10 lead to a discharge hose or the like 11, said connections also including a T 12 with which the interior of an upwardly closing check valve 12' communicates, said valve being adapted to establish communication between an air inlet 13 and the hose 11 after valve 10 has been closed. This permits the liquid to drain from said hose but when the pump is in operation the valve 12 will close automatically so that no liquid will escape therethrough, The pipe line 4 passes through a suitable base 14 from which standards 15 rise to a casting or the like 16 which serves as a support for numerous working parts yet to be described, and if desired a casing 17 may surround the standards 15 and extend between the base 14 and casting 16, said casing housing therein a portion of the pipe line 4 as well as the pump 8, the operating handle 18 of said pump however, being necessarily disposed on the exterior of the casing. The filter 7, valve 10 and inlet 13 are all disposed above the casting 16 and by preference a casing 19 will cover these parts, said casing including a vertical plate 20 secured rigidly to said casting. A horizontal shaft 21 projects loosely through an opening in said plate and this shaft also extends through a substantially air-tight casing 22 rising from the casting 16, being equipped in said casing with a pulley or the like 23, over which a chain or the equivalent 24 passes, the opposite ends of said chain depending into a pair of pipes 25 and 26, a balancing weight 27 being secured on one end of said chain and mounted slidably in pipe 25 while the other end of the chain is positioned within the tank 1 and is equipped with a float 28 to ride on the liquid in said tank. The pipes 25 and 26 although rising from the tank 1 will not serve to carry off fumes from the latter due to the provision of the casing 22, the latter being therefore a salient feature when the apparatus is employed for vending gasolene or other liquid fuels.

By the construction just described, when liquid is withdrawn from the tank 1, the float 28 lowers, thus so moving the chain 24 as to rotate the shaft 21. This actuates the indicating means yet to be described and also moves a tape 29 passing around a pulley 30 on said shaft, said tape being graduated so as to disclose the quantity of liquid in the tank at all times.

The indicating means above referred to includes a friction disk 31 secured on the shaft 21 in rear of the plate 20, a second friction disk 32 rotatable and slidable on said shaft, a spring 33 for forcing the two disks into engagement, an adjusting sleeve 34 surrounding shaft 21 and passing through plate 20, and an indicating arm 35 projecting upwardly and forwardly from the movable disk 32. The free end of arm 35 extends through a slot 36 in plate 20 and is provided with an indicating finger 37 coöperating with a scale 38 on said plate, said slot and scale being both concentric to the shaft 21.

By the construction so far described, the indicating arm 35 may be adjusted by means of the sleeve 34 so that the pointer 37 stands opposite 5 on the scale 38 if five gallons of liquid are to be discharged, it being understood that in order to make this adjustment the disk 32 must be moved out of contact with 31 against the tension of the spring 33. This adjustment having been made, the valve 10 is opened and the pump 8 is operated, thus causing chain 24 as it is operated by the descending float 28 to turn the shaft 21 so that the pointer 37 moves toward its initial position at zero. When this point is reached the valve 10 is automatically closed by means yet to be described, thus cutting off the supply of liquid and permitting the check valve 12 to admit air into hose 11 to allow all fluid in the latter to drain therefrom.

Included in the means above mentioned for automatically closing valve 10, is a vertically disposed valve control rod 39 which when raised is adapted to open the valve 10, said rod having rigidly secured thereto a hook-like locking member 40 coöperating with a latch 41 which is pivotally mounted on the rear side of the plate 20, the two parts 40 and 41 being adapted to engage when the rod 39 is raised for the purpose of holding said rod in this position until 41 is released. For so releasing the latch 41 a trip device 42 preferably in the form of a weight is pivoted to the rear face of plate 20, said weight being adapted to swing downwardly and strike the latch 41 to release the same, in which position it normally stands as shown in Fig. 8. When the rod 39 is raised, however, a handle 43 with which said rod is equipped swings upwardly around its pivot so that the angular arm 44 of said handle moves beneath and lifts the weight 42 to the position shown in Fig. 9, said weight moving slightly beyond dead center and being limited by a stop pin or the like 45.

The indicating arm 35 is provided with a laterally extending finger 46 shown in elevation in Figs. 4, 5 and 10 and in section in Figs. 8 and 9. This finger is so disposed as to strike the weight 42 when the arm 35 returns to its initial position when expelling liquid in the manner above described, the result being that said weight will be moved beyond the center of gravity and will fall from the position of Fig. 9 to that of Fig. 8, thus releasing the latch 41 whereupon rod 39 drops by gravity or by any other impelling force to close the valve 10, thereby automatically stopping the discharge of liquid.

The general construction shown and described operates to advantage in the manner set forth and for this reason the type of the invention in question is preferably formed in this manner, but it is to be understood that the specific details shown and described need not be followed too closely.

In Fig. 12, 19' designates a casing similar to the casing 19 and mounted within said casing is a shaft 21' corresponding to the shaft 21 and carrying substantially the same parts as the latter, said shaft being turned by a chain 24′ having a float 28′ and a weight 27′ on its opposite ends. In this type of the invention the casing 19′ rests on the tank 1′, which latter is employed in stores or the like. The pipe line 4 is eliminated in favor of an equivalent line 4′ which rises from the bottom of the tank above said tank and is equipped with a discharge neck 50 over a screened opening 51 in the top of said tank, the line 4′ having a suitable pump 8′ and being equipped within the tank 1′ with a control valve 10′. A rod 39′ corresponding to the rod 39 above described rises from the valve 10′ into the casing 19′.

The tape 29 and pulley 30 are eliminated in the form of the invention shown in Fig. 12 and a suitable gage 29′ is employed in lieu thereof. All of the other features of construction are the same as in the type of the invention first described and need not therefore be further entered into.

In Fig. 13, a portion of a tank is shown, said tank having at its lower end an outlet pipe 4″ with a suitable discharge neck 50′, said pipe being provided with a valve 10″ from which an operating rod 39″ rises; and in connection with these features a pump is unnecessary for discharging the liquid since it is fed by gravity when the valve is opened and said valve will be controlled in the same manner as the valves 10 and 10′ above described.

The construction shown in Figs. 14, 15 and 16 is identical with that first described with the exception that the automatic means for closing the outlet valve is eliminated. A valve 10ª, however, is employed in the pipe connections 9ª which lead to the discharge hose 11ª, a check valve 12ª and air inlet 13ª being provided for admitting air into said hose after said valve 10ª is closed, the latter operation being performed by any suitable operating connections such as those indicated at 60.

In the form of the apparatus just described the pointer 37ª is set at the required point on the scale 38ª and the pump 8ª is operated, whereupon said pointer will move back along the scale as the liquid is discharged, and when said pointer reaches zero, operation of the pump will be suspended to stop the flow of liquid. This having been done the valve 10ª is closed by hand and the air flowing into the hose 11ª through the check valve 12ª will permit the liquid in said hose to drain therefrom.

It is to be understood that the automatic valve cut off means might well be eliminated in an apparatus employing the gravity feed of Fig. 13, or the pipe line 4′ of Fig. 12, in addition to the style of the device described as having no such means.

From the foregoing, taken in connection with the accompanying drawings, it will be observed that the invention in all of its forms is comparatively simple and inexpensive, yet highly efficient and durable. For these reasons, the structures shown constitute the preferred forms of the apparatus and it is to be understood that within the scope of the invention as claimed, numerous changes may be made without sacrificing the principal advantages.

I claim:

1. In a liquid dispensing apparatus, the combination of a supply tank, an indicator and a scale with which it coöperates, said indicator being adjustable to set it at any required point on the scale, means for discharging the liquid from the tank including a valve, means for moving the indicator back along the scale as the liquid level lowers, a control member for opening the valve, means for locking said control member in position to hold the valve open, and means operable from said indicator when it reaches its initial position for releasing said locking means.

2. In a liquid dispensing apparatus, the combination of a supply tank, an indicator and a scale with which it coöperates, said indicator being adjustable to set it at any required point on the scale, means for discharging the liquid from the tank including a valve, means for moving the indicator back along the scale as the liquid level lowers, a control member for opening the valve, means for locking said control member in position to hold the valve open, and a trip weight operable from said indicator when it reaches its initial position for releasing said locking means.

3. In a liquid dispensing apparatus, the combination of a supply tank, an indicator and a scale with which it coöperates, said indicator being adjustable to set it at any required point on the scale, means for discharging the liquid from the tank including a valve, means for moving the indicator back along the scale as the liquid level lowers, a control member for opening the valve, means for locking said control member in position to hold the valve open, a trip weight mounted to fall and release said locking means, and a handle for the aforesaid control member, said handle also serving to raise said weight when moved to open the valve, and the aforesaid indicator acting to release said weight when said indicator returns to its initial position.

4. In a liquid dispensing apparatus, the combination of a supply tank, an indicator and a scale with which it coöperates, the former being adjustable along the latter, means for discharging the liquid from the tank including a valve, means for moving the indicator back along the scale as the liquid level lowers, a control member for the aforesaid valve, means for locking said control member in position to hold the valve open, and a pivoted weight adapted to swing downwardly to release said locking means, the aforesaid indicator serving to trip said weight when the former reaches its initial position.

5. In a liquid dispensing apparatus, the combination of a supply tank, an indicator and a scale coöperating therewith, the former being adjustable along the latter, means for discharging the liquid from the tank including a valve, means for moving said indicator back along the scale as the liquid level lowers, a control member for said valve, means for locking said control member in raised position to hold the valve open, a weight adapted to fall to release said locking means, and a handle for the control member pivotally connected with the latter and adapted when shifted upwardly to move beneath and lift the weight to its raised position, the aforesaid indicator serving to trip said weight when it reaches its initial position.

In testimony whereof I have hereunto set my hand in the presence of two subscribing witnesses.

JAMES ALBERT PRICE.

Witnesses:
L. L. SHOEMAKER,
W. S. LAUNSTEIN.